United States Patent [19]

Strand

[11] 4,191,677

[45] Mar. 4, 1980

[54] SELF-LOCKING THREADED FASTENER PRODUCT

[75] Inventor: Norman S. Strand, Howell, Mich.

[73] Assignee: Federal Screw Works, Detroit, Mich.

[21] Appl. No.: 844,201

[22] Filed: Oct. 21, 1977

[51] Int. Cl.[2] .................. C08L 63/00; F16B 39/22
[52] U.S. Cl. .................. 260/37 EP; 85/1 C;
   151/7; 260/42.43; 427/386; 528/403; 528/408;
   525/187
[58] Field of Search .................. 151/7; 85/1 C;
   260/37 EP, 2.5 EP, 837, 42.43; 427/386;
   528/403, 408

[56] References Cited

U.S. PATENT DOCUMENTS

| | | | |
|---|---|---|---|
| 2,321,414 | 6/1943 | Parker | 85/1 |
| 2,686,342 | 8/1954 | D'Eustachio | 20/56.5 |
| 2,741,288 | 4/1956 | Johnson | 151/7 |
| 2,928,446 | 3/1960 | James et al. | 151/7 |
| 3,022,197 | 2/1962 | Jedlicka | 117/132 |
| 3,046,262 | 7/1962 | Krieble | 85/1 C |
| 3,093,177 | 6/1963 | Villo | 151/7 |
| 3,146,142 | 8/1964 | Maly | 155/91 |
| 3,294,139 | 12/1966 | Preziosi | 151/7 |
| 3,434,087 | 3/1969 | Hofmann | 260/37 EP |
| 3,437,541 | 4/1969 | Cooper et al. | 156/306 |
| 3,498,352 | 3/1970 | Duffy | 151/7 |
| 3,554,258 | 6/1971 | Duffy | 151/7 |
| 3,568,746 | 3/1971 | Faroni | 151/7 |
| 3,578,615 | 5/1971 | Moore et al. | 260/37 EP |
| 3,737,355 | 6/1973 | Epstein et al. | 156/293 |
| 3,746,068 | 7/1973 | Deckert et al. | 427/136 |
| 3,756,984 | 9/1973 | Klaren et al. | 260/37 EP |
| 3,784,435 | 1/1974 | Bagheri et al. | 156/293 |
| 3,818,525 | 6/1974 | Bedi | 10/27 R |
| 4,081,012 | 3/1978 | Wallace et al. | 151/14.5 |

FOREIGN PATENT DOCUMENTS

514296  7/1955  Canada .................. 85/1 C

*Primary Examiner*—Melvyn I. Marquis
*Attorney, Agent, or Firm*—Harness, Dickey & Pierce

[57] ABSTRACT

This disclosure relates to a new self-locking threaded fastener means having a patch on the threaded portion thereof to provide self-locking properties. The patch may be comprised of a thermoplastic polymer such as a thermoplastic epoxy adhesive system and is applied to the threaded fastener in an unpolymerized state and is allowed to polymerize in situ. Since an unpolymerized adhesive composition would be applied as a liquid, it would not be necessary to heat the fastener, thus saving valuable energy as well as eliminating the chance of destroying any corrosion resistant coating on the fastener such as phosphate and oil. This new fastener means also has good multiple usage characteristics in that it may be installed and removed several times without losing its self-locking properties.

24 Claims, 3 Drawing Figures

SELF-LOCKING THREADED FASTENER PRODUCT

BACKGROUND OF THE INVENTION

The present invention pertains primarily to self-locking threaded fastener means, and more particularly to threaded fastener means having self-locking properties provided by the use of an interference creating material on the threaded portion thereof.

The following cited references are believed to be representative of the state of the art:

| U.S. Pat. No. | Inventor | Issued |
| --- | --- | --- |
| 2,321,414 | Parker | June 8, 1943 |
| 2,686,342 | D'Eustachio | August 17, 1954 |
| 2,741,288 | Johnson | April 10, 1956 |
| 2,928,446 | James et al | March 15, 1960 |
| 3,022,197 | Jedlicka | February 20, 1962 |
| 3,093,177 | Villo | June 11, 1963 |
| 3,146,142 | Maly | August 25, 1964 |
| 3,294,139 | Preziosi | December 27, 1966 |
| 3,437,541 | Cooper et al | April 8, 1969 |
| 3,498,352 | Duffy | March 3, 1970 |
| 3,554,258 | Duffy | January 12, 1971 |
| 3,568,746 | Faroni et al | March 9, 1971 |
| 3,737,355 | Epstein et al | June 5, 1973 |
| 3,784,435 | Bagheri et al | January 8, 1974 |
| 3,818,525 | Bedi | June 25, 1974 | and U.S. application Ser. No. 737,558, filed Nov. 1, 1976, assigned to Federal Screw Works.

Generally, threaded fastener means having self-locking properties provided by the use of an interference creating material on the threaded portion thereof, have consisted of fasteners coated in part with soft metal, rubber, nylon, polyester or the like. These fastener means, some of which are known as patch bolts, function by providing an interference fit between two mating threaded surfces, thereby eliminating or substantially reducing relative movement of the two mating surfaces.

Such fastener means should be distinguished from thread-locking materials which typically create a permanent adhesive bond between the two mating threaded surfaces and usually are formulated using thermosetting adhesives such as epoxies, etc. Patch-type fasteners, on the other hand, do not create an adhesive bond between the two mating surfaces, and usually are made using heat-bonded thermoplastic materials. Patch-type fasteners must be capable of exhibiting the yield necessary for an interference fit but yet provide adequate resistance to relative movement of the two mating threaded surfaces. Patch-type fasteners are important in terms of both the on and off directions, and not just the off direction as is the case with thread-locking materials.

An additional requirement encountered in many of the applications of such fastener means is that of multiple usage. Multiple usage is the term used to describe repeated installation and removal of the same fastener. Typical of the industry tests of such properties is the "fifth off" test. This test measures the capability of the same fastener means to be used five times. The fifth off value is the break away torque encountered in an effort to loosen the bolt after the fifth installation. Meeting this requirement but yet maintaining adequate retention has often proved to be a difficult task for many prior art materials since once a material is permanently deformed, its performance as a patch in such a fastener decreases. Repeated deformation aggravates the problem drastically.

For this reason, most present day patch bolts or similar fasteners are made using nylon, a thermoplastic material which exhibits desirable yield properties as well as good interference characteristics when properly positioned. However positioning the nylon patch often presents some problems. For example, if a portion of a threaded bolt is machined out in order to insert a nylon interference creating patch, substantial machining costs are incurred and part of the overall bolt strength is diminished. If, in the alternative, a nylon patch is applied over the threads of a regular bolt by heat-bonding, the more common practice, the bolt must be heated to approximately 600° F. in order to melt on the nylon patch, thereby using a fairly substantial amount of valuable energy as well as often destroying any corrosion resistant coating on the bolt such as phoshate and oil, which breaks down at temperatures in the range of 200°–300° F.

Although alternative materials such as polyesters or some forms of epoxies have been used in an attempt to overcome the problems encountered with nylon, or for that matter, the similar problems that would be encountered with a soft metal or rubber patch, many of these alternatives have proven to be either too expensive as is the case with most polyesters, or have not provided satisfactory application procedures nor adequate overall performance characteristics.

It is a principle object of the present invention therefore to provide an improved self-locking fastener means.

Another object of the present invention is to provide a new and improved fastener product which includes a patch material which is polymerized on the fastener.

It is a further object of the present invention to provide a relatively inexpensive patch material for use on patch bolts which comprises a thermoplastic epoxy adhesive system which is polymerized in situ.

It is yet another object of the present invention to provide a patch material which is energy effective and does not destroy corrosion resistant coatings such as phosphate and oil upon application to the fastener and also has good multiple usage properties.

Other objects, features and advantages of the present invention will become apparent from the subsequent description, and examples, and the appended claims taken in conjunction with the accompanying drawings.

SUMMARY OF THE INVENTION

In accordance with the present invention, a self-locking threaded fastener menas is provided which has a patch on the threaded portion thereof to provide the self-locking properties, said patch being comprised of a thermoplastic polymer which is applied to the threaded fastener in an unpolymerized state and is allowed to polymerize in situ. The patch may be comprised of a thermoplastic epoxy adhesive system which would include an epoxy resin portion, a polymerizing agent portion, as well as other matrials added to improve performance of the fastener means.

BRIEF DESCRIPTION OF THE DRAWINGS

The foregoing objects and others will be pointed out more fully hereinafter in conjunction with the description of the preferred embodiment of the present invention illustrated in the accompanying drawings and examples and in which.

DESCRIPTION OF THE PREFERRED EMBODIMENT

Figure 1:
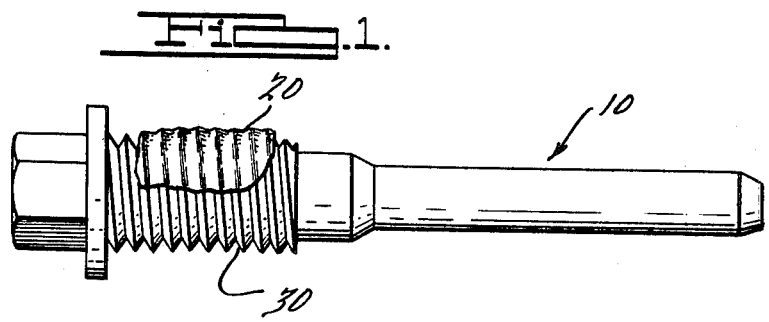
FIG. 1 is a side elevational view of the present invention as shown on a caliper bolt.

Referring now to the drawings wherein the showings are for the purpose of illustrating a preferred embodiment of the ivention only and are not for the purpose of limiting the invention, FIG. 1 shows a caliper bolt 10, such as that used in automotive brake systems, which is partially coated on its upper portion only with an adhesive composition or patch 20. Said patch is aplied to the threaded portion 30 of bolt 10 in the area in which the bolt will later be secured by means of a nut or the like.

Figure 2:
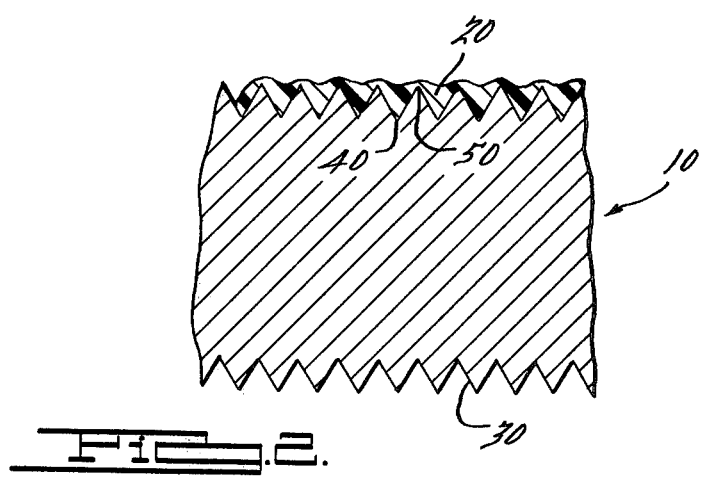
FIG. 2 is a cross-sectional view of the present invention along the line 2—2 of FIG. 1.

FIG. 2 shows the adhesive composition or patch 20 as applied to the bolt 10. The patch is applied so that it fills the roots 40 of the threaded portion 30, but normally not so as to rise above the crests 50 of said thread to any appreciable degree. Placing too thick a patch on the bolt would require unduly high assembly force when threading on a nut or the like and may even strip or break one or both of the mating fasteners.

Figure 3:
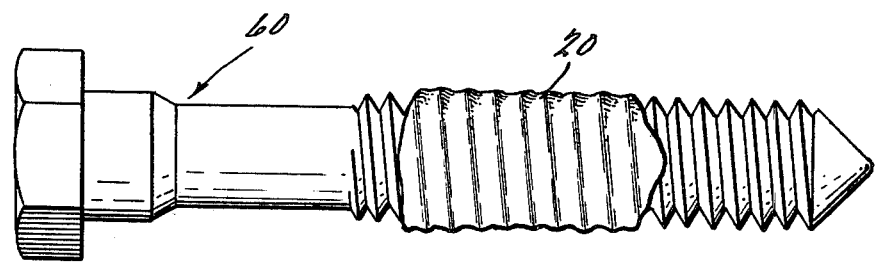
Fig. 3 is a side elevational view of the present invention as shown on a bed bolt.

FIG. 3 shows a bed bolt 60, such as that used in truck beds, which is partially coated with the adhesive composition or patch 20 of the present invention. Unlike the patch of FIG. 1, this patch extends around the circumference of the bolt to provide additional interference and thus increased resistance to the removal of the mating threaded surface.

The adhesive composition or patch of the present invention, as shown in this preferred embodiment, comprises a thermoplastic epoxy adhesive system made up of an epoxy resin portion and a polymerizing agent portion. Enough of the polymerizing agent portion must be present to polymerize the epoxy resin portion. The epoxy resin portion comprises a thermoplastic epoxy resin, an example of which is diglycidyl ether of bisphenol A, such as Dow Chemical epoxy 332. It should be appreciated that other thermoplastic materials such as nylon, polyester or the like may be used as the patch and are intended to come within the scope of this invention.

Additional materials may be added to the epoxy resin portion in order to improve performance properties. For example, a filler such as glass beads may be added to provide abrasive interference and additional mechanical interlock for the fastener system. It has been found that glass beads, such as those obtained from Potter's Industries, function the best in the applications tested. Other fillers that may be used include silicon carbide, silica, quartz, beta eucryptite, alumina, and polyvinylidene chloride micro-balloons.

Fumed silica may also be used to increase adhesion. An example of such fumed silica is Syloid 244, manufactured by Davison Chemical Division of Grace Company.

The epoxy resin portion may also contain glass fibers such as Owens-Corning "Fiberglass" glass fibers which are used as a reinforcing material to increase the strength of the cured adhesive.

A most beneficial additive to the epoxy resin portion is imbiber beads. The imbiber beads are used to absorb oil found on the fastener prior to the application of the patch and to increase the mechanical strength of the fastener system due to their expansion after oil absorption. An example of such imbiber beads is Dow Chemical alkylstyrene polymer (sold under the trademark "Dow Imbiber Beads" and marketed by Gedcor Environmental Protection Corporation, Westland, Michigan.)

The epoxy resin portion may also contain hydrophobic fumed silica which is used to prevent particles of the pulverized adhesive from absorbing water. A finely divided hydrophobic fumed silica is distributed throughout the adhesive resin. An example of such hydrophobic fumed silica is Tullanox by Tulco Company.

The polymerizing agent portion of the thermoplastic epoxy adhesive system of this preferred embodiment of the present invention functions to polymerize the epoxy resin poriton once the two portions are mixed together and applied to a fastener. An example of such a polymerizing agent designed for use with the epoxy resin described above is MEA or monoethanolamine, such as that manufactured by Dow Chemical Co., although any difunctional amine or phosphine based catalyst should also perform as required.

In addition, the polymerizing agent portion may comprise methylene-bis-4-cyclohexylamine, such as that manufactured by E. I. duPont de Nemours, Inc. as well as an asbestos-type thixotropic agent or fumed silica. Calidria, manufactured by Union Carbide is an example of an asbestos-type thixotropic agent, while Cab-O-Sil, manufactured by Cabot Co. is an example of a suitable fumed silica.

EXAMPLE 1

An exemplary formulation of a preferred embodiment of the present invention which has been found to provide excellent performance properties is given below:

| Part A: Epoxy Resin Portion | |
| --- | --- |
| Ingredient | Amount by Weight |
| Dow epoxy 332 | 1000 |
| Potter's industries glass beads (filler) | 270 |
| Syloid 244 fumed silica | 7 |
| Owens-Corning "Fiberglass" glass fiber | 175 |
| Dow imbiber beads (alkylstyrene polymer) | 35 |
| Tullanox hydrophobic fumed silica | 18 |
| Chromium yellow color pigment | 5 |

(The above formulation is the same as that disclosed in a copending U.S. application, Ser. No. 737,558, filed Nov. 1, 1976.)

| Part B: Polymerizing Agent Portion | |
| --- | --- |
| Ingredient | Amount by Weight |
| Dow MEA monoethanolamine | 2.6 |
| DuPont methylene-bis-4-cyclohexylamine | 1.6 |
| Union Carbide Calidria | 1.7 |

A stoichiometric relationship exists between Part A (the epoxy resin portion) and Part B (the polymerizing agent portion) in that enough of Part B must be supplied to effect a full care of Part A. It has been found that 33.4 parts by weight of Part A to 5.9 parts by weight of Part B provides such a stoichiometric relationship:

| Part | Amount by Weight |
|------|------------------|
| A | 33.4 |
| B | 5.9 |

EXAMPLE 2

The following tests were conducted to compare the performance characteristics of the thermoplastic epoxy adhesive system patch of the present invention with those of a state of the art heat-bonded nylon patch. All tests were conducted using threaded, b 5/16 inch, zinc finish, grade 5 bolts and threaded, 5/16 inch, dry phosphate finish, grade 5 nuts. General Motors Engineering Performance Specifications P-6175-D was used as a guide. All numerical values are given in inch-pounds of torque, and are average values of ten trials. The "Prevailing-on-Torque" is the torque encountered in the on direction measured when the nut is completely in engagement with the patch on the male thread. The "Prevailing-off Torque" is the torque encountered in the off direction and indicates the amount of interference and resistance to movement provided by the patch. The assembly torque was maintained at 150 inch-pounds of torque for all assemblies in this example. Normally the tension of the nutbolt assembly without any patch is assumed to be zero.

patch bolt, as shown in Tests No. 1, 2, and 3. In a fastener means of this type where self-locking properties are desired, the "Prevailing-off Torque" is the most critical performance property since it indicates the amount of interference provided by the patch material. It should also be noted that the "Fifth Removal Prevailing-off Torque" value of the formulation of the present invention is almost three times that of the heat-bonded nylon patch material, which indicates a significant advantage of the present invention. It should also be noted that the "Prevailing-on Torque" values of the formulation of Example 1 of the present invention are such that no stripping or shearing of fasteners should occur during installation.

Tests No. 4 and 5 were conducted to determine the resistance of the patch material made according to the formulation of Example 1 of the present invention, to gasoline and oil which are often found in the environment in which such patch bolts are used. As shown in the above table, the material of the present invention exceeded the required specification value in both tests.

Once the liquid thermoplastic epoxy adhesive system of the preferred embodiment (Parts A and B) is applied to a fastener, it will normally cure at room temperature within 1 to 10 minutes, or may be accelerated by heat. This minimal curing time is very attractive to fastener manufacturers since little if any capital expense is involved in the purchase of ovens or induction heaters,

| TEST | Heat-Bonded Nylon Patch | Formulation of Example of the Present Invention | General Motors Specification Requirement |
|------|-------------------------|-------------------------------------------------|------------------------------------------|
| 1. First Application @ 75° F. ± 5% (Ambient Temperature) | | | |
| .Prevailing-on Torque | 31.0 | 30 | 85 in.-lbs. maximum |
| .Prevailing-off Torque | 15.2 | 15.9 | 4 in.-lbs. minimum |
| .Assembly Torque | 150.0 | 150.0 | 150 in.-lbs. |
| 2. Fifth Removal | | | |
| .Prevailing-on Torque | 3.9 | 9.3 | 85 in.-lbs. maximum |
| .Prevailing-off Torque | 2.6 | 7.2 | 2.5 in.-lbs. minimum |
| 3. Heat Test @ 250° F.- For One Hour | | | |
| .Prevailing-off Torque | 3.1 | 7.1 | 4 in.-lbs. minimum |
| 4. Gasoline Immersion Test (168 hrs. @ 25 ± 2° C.(77 ± 4° C.) plus 1 hr. @ 25 ± 2° C.) | | | |
| .Prevailing-off Torque | — | 20.8 | 4 in.-lbs. minimum |
| 5. Engine Oil Immersion Test (168 hrs. @ 150° C. (302° F.) plus 1 hr. @ 25 ± 2° C. | | | |
| .Prevailing-off Torque | — | 7.0 | 4 in.-lbs. minimum |

It should be noted that in comparing the performance of the two patch materials, the formulation of Example 1 of the present invention has consistently better "Prevailing-off Torque" values than the heat-bonded nylon etc., again saving valuable energy.

Another advantage of the present invention is that it is applied to the fastener as a liquid and thus there is no necessity to heat up the bolt to high temperatures as is the case with heat-bonded nylon; the present invention thereby saving valuable enerby as well as not destroying any corrosion resistant coating as described earlier in this specification. Since the patch goes on as a liquid, the flow may easily be controlled by controlling thixotropy. For example, the material may be applied to only a part of the bolt (see FIG. 1) or allowed to flow completely around the threads (see FIG. 3). Typical nylon materials, on the other hand, would have to be sprayed around the heated bolt in a complicated manner.

The thermoplastic epoxy-type patch material of the present invention described in the preferred embodiment, in addition to being less expensive than typical nylon or polyester materials, has better heat resistance and thus is attractive to manufacturers whose fastener applications and operating environments involve high heat levels. However, it should be noted that unpolymerized nylon or polyester materials, or any other similar thermoplastic materials, may also be used in the present invention and be polymerized on the fastener in a manner similar to that of the thermoplastic epoxy adhesive system of the preferred embodiment.

The adhesive composition described in the preferred embodiment of the present invention has also been found to be compatible with and to not destroy phosphate and oil coatings on bolts, in addition to being able to be applied directly over such oil coatings, and thus is very attractive to those manufacturers who require bolts to be corrosion resistant. Such requirements are typical of the automotive industry.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A self-locking threaded fastener means having a patch on the threaded portion thereof to provide said self-locking properties, said patch comprising a cured thermoplastic epoxy adhesive which has been mixed together off the fastener means and applied to said fastener in an unpolymerized state and allowed to polymerize to a thermoplastic polymer on said fastener.

2. The fastener means of claim 1 wherein said thermoplastic epoxy adhesive comprises an epoxy resin portion and a polymerizing agent portion in sufficient amount to polymerize said epoxy resin portion.

3. The fastener means of claim 2 wherein said epoxy resin portion comrises a thermoplastic epoxy resin.

4. The fastener means of claim 3 wherein said thermoplastic epoxy resin is diglycidyl ether of bisphenol A.

5. The fastener means of claim 3 wherein said epoxy resin portion further comprises a filler to improve mechanical properties comprised of at least one material selected from the group consisting of glass beads, silicon carbide, silica, quartz, clay, beta eucryptite, alumina, polyvinylidene chloride micro-balloons, fumed silica to increase adhesion, glass fibers to increase strength, imbiber beads to absorb oil, and hydrophobic fumed silica to prevent absorption of water by the adhesive.

6. The fastener means of claim 5 wherein said imbiber beads are alkylstyrene polymer.

7. The fastener means of claim 2 wherein said polymerizing agent portion comprises at least one material selected from the group consisting of difunctional amines or phosphine based catalysts.

8. The fastener means of claim 7 wherein said polymerizing agent portion comprises monoethanolamine.

9. The fastener means of claim 7 wherein said polymerizing agent portion further comprises methylene-bis-4-cyclohexylamine and at least one material selected from the group consisting of asbestos-type thixotropic agents or fumed silica.

10. A self-locking threaded fastener means having a patch on the threaded portion thereof to provide self-locking properties, said patch comprising a cured adhesive composition comprised of:
    an epoxy resin portion comprised of a thermoplastic epoxy resin and a filler comprised of at least one material selected from the group consisting of glass beads, silicon carbide, silica, quartz, clay, beta eucryptite, alumina, polyvinylidene chloride micro-balloons, fumed silica, glass fibers, imbiber beads, and hydrophobic fumed silica, and
    a polymerizing agent portion comprised of at least one material selected from the group consisting of difunctional amines or phosphine based catalysts, methylene-bis-4-cyclohexylamine, and at least one material selected from the group consisting of asbestos-type thixotropic agents or fumed silica,
    said adhesive composition having been mixed together off the fastener means and applied to said fastener in an unpolymerized state and allowed to polymerize to a thermoplastic polymer on said fastener.

11. The fastener means of claim 10 wherein said thermoplastic epoxy resin is diglycidyl ether of bisphenol A.

12. The fastener means of claim 10 wherein said polymerizing agent portion comprises monoethanolamine.

13. A method of manufacturing a self-locking threaded fastener means having a patch on the threaded portion thereof to provide self-locking properties, which comprises:
    applying an unpolymerized patch material comprised of a thermoplastic epoxy adhesive system which has been mixed together off the fastener means to said threaded fastener, and
    allowing said umpolymerized thermoplastic patch material to polymerize to a thermoplastic polymer on said threaded fastener.

14. The method of claim 13 wherein said thermoplastic epoxy adhesive comprises an epoxy resin portion and a polymerizing agent portion in sufficient amount to polymerize said epoxy resin portion.

15. The method of claim 14 wherein said epoxy resin portion comprises a thermoplastic epoxy resin.

16. The method of claim 15 wherein said thermoplastic epoxy resin is diglycidyl ether of bisphenol A.

17. The method of claim 15 wherein said epoxy resin portion further comprises a filler to improve mechanical properties comprised of at least one material selected from the group consisting of glass beads, silicon carbide, silica, quartz, clay, beta eucryptite, alumina, polyvinylidene chloride micro-balloons, fumed silica to increase adhesion, glass fibers to increase strength, imbiber beads to absorb oil, and hydrophobic fumed silica to prevent absorption of water by the adhesive.

18. The method of claim 17 wherein said imbiber beads are alkylstyrene polymer.

19. The method of claim 14 wherein said polymerizing agent portion comprises at least one material from the group consisting of difunctional amines or phosphine based catalysts.

20. The method of claim 19 wherein said polymerizing agent portion comprises monoethanolamine.

21. The method of claim 19 wherein said polymerizing agent portion further comprises methylene-bis-4-cyclohexylamine and at least one material selected from the group consisting of asbestos-type thixotropic agents or fumed silica.

22. A method of manufacturing a self-locking threaded fastener means having a patch on the threaded portion thereof to provide self-locking properties, which comprises:
  applying an unpolymerized patch material comprised of a thermoplastic epoxy adhesive system which has been mixed together off the fastener means to said threaded fastener, said thermoplastic epoxy adhesive being comprised of:
    an epoxy resin portion comprised of a thermoplastic epoxy resin and a filler comprised of at least one material selected from the group consisting of glass beads, silicon carbide, silica, quartz, clay, beta eucryptite, alumina, polyvinylidene Chloride micro-balloons, fumed silica, glass fibers, imbiber beads, and hydrophobic fumed silica, and
    a polymerizing agent portion comprised of at least one material selected from the group consisting of difunctional amines or phosphine based catalysts, methylene-bis-4-cyclohexylamine, and at least one material selected from the group consisting of asbestos-type thixotropic agents or fumed silica, and
  allowing said unpolymerized thermoplastic patch material to polymerize to a thermoplastic polymer on said threaded fastener.

23. The method of claim 22 wherein said therrmoplastic epoxy resin is diglycidyl ether of bisphenol A.

24. The method of claim 22 wherein said polymerizing agent portion comprises monoethanolamine.

* * * * *

UNITED STATES PATENT AND TRADEMARK OFFICE
CERTIFICATE OF CORRECTION

PATENT NO. : 4,191,677

DATED : March 4, 1980

INVENTOR(S) : Norman S. Strand

It is certified that error appears in the above–identified patent and that said Letters Patent are hereby corrected as shown below:

Column 1, line 38, "surfces" should be --surfaces--.
Column 2, line 19, "phoshate" should be --phosphate--.
Column 2, line 54, "menas" should be --means--.
Column 2, line 62, "matrials" should be --materials--.
Column 3, line 14, "ivention" should be --invention--.
Column 3, line 18, "aplied" should be --applied--.
Column 4, line 19, "poriton" should be --portion--.
Column 5, line 13, following "threaded" delete "b".
Column 7, line 5, "enerby" should be --energy--.
Column 7, line 54 (Claim 3), "comrises" should be --comprises--.
Column 8, line 47 (Claim 13), "umpolymerized" should be --unpolymerized--.
Column 10, line 3 (Claim 22), "Chlo-" should be --chlo- --.
Column 10, line 18 (Claim 23), "therrmo-" should be --thermo- --.

Signed and Sealed this

Fifteenth Day of July 1980

[SEAL]

Attest:

SIDNEY A. DIAMOND

Attesting Officer

Commissioner of Patents and Trademarks